United States Patent
Hehn et al.

(10) Patent No.: US 12,493,986 B2
(45) Date of Patent: Dec. 9, 2025

(54) METHOD AND SYSTEM FOR DETERMINING A STATE OF A CAMERA

(71) Applicant: Verity AG, Zürich (CH)

(72) Inventors: Markus Hehn, Zürich (CH); Fabio Rossetto, Zürich (CH)

(73) Assignee: Verity AG, Zürich (CH)

( * ) Notice: Subject to any disclaimer, the term of this patent is extended or adjusted under 35 U.S.C. 154(b) by 305 days.

(21) Appl. No.: 18/270,397

(22) PCT Filed: Dec. 13, 2021

(86) PCT No.: PCT/IB2021/061637
§ 371 (c)(1),
(2) Date: Jun. 29, 2023

(87) PCT Pub. No.: WO2022/144653
PCT Pub. Date: Jul. 7, 2022

(65) Prior Publication Data
US 2024/0078686 A1    Mar. 7, 2024

Related U.S. Application Data

(60) Provisional application No. 63/132,142, filed on Dec. 30, 2020, provisional application No. 63/132,176, filed on Dec. 30, 2020.

(51) Int. Cl.
*G06T 7/73* (2017.01)
*G06T 7/246* (2017.01)
*G06T 7/277* (2017.01)

(52) U.S. Cl.
CPC ............... *G06T 7/75* (2017.01); *G06T 7/251* (2017.01); *G06T 7/277* (2017.01);
(Continued)

(58) Field of Classification Search
CPC . G06T 2207/10004; G06T 2207/10028; G06T 2207/30204; G06T 2207/30252; G06T 7/251; G06T 7/277; G06T 7/75
(Continued)

(56) References Cited

U.S. PATENT DOCUMENTS

| | | | |
|---|---|---|---|
| 2015/0172626 A1* | 6/2015 | Martini | G06T 7/246 348/50 |
| 2020/0001188 A1 | 1/2020 | Pedersen et al. | |
| 2020/0364883 A1 | 11/2020 | Hoffmann et al. | |

FOREIGN PATENT DOCUMENTS

| | | |
|---|---|---|
| CN | 111197984 A | 5/2020 |
| EP | 2302586 A1 | 3/2011 |

(Continued)

OTHER PUBLICATIONS

Office Action issued in European Patent Application No. 21835397.7, mailed Jun. 16, 2025, 11 pages.
(Continued)

*Primary Examiner* — Kenny A Cese
(74) *Attorney, Agent, or Firm* — BLANK ROME LLP

(57) ABSTRACT

The invention relates to a method for determining a state $x_k$ (8) of a camera (11) at a time $t_k$, the state $x_k$ (8) being a realization of a state random variable $X_k$, wherein the state is related to a state-space model of a movement of the camera (11). The method comprises the following steps: a) receiving an image (1) of a scene of interest (15) in an indoor environment (15) captured by the camera (11) at the time $t_k$, wherein the indoor environment (15) comprises N landmarks (9) having known positions in a world coordinate system (12), N being a natural number; b) receiving a state estimate $\hat{x}_k$ (2) of the camera (11) at the time $t_k$, c) determining (3) positions of M features in the image (1), M being a natural number; d) receiving (4) distance data indicative of distance between the M features and the
(Continued)

corresponding M landmarks (9), respectively; e) determining (5) an injective mapping estimate from the M features into the set of the N landmarks (9) using at least (i) the positions of the M features in the image and (ii) the state estimate (2); f) using the determined injective mapping estimate (5) to set up (6) an observation model in the state-space model, wherein the observation model is configured for mapping the state random variable $X_k$ of the camera onto a joint observation random variable $Z_k$, wherein at the time $t_k$, an observation $z_k$ is a realization of the joint observation random variable $Z_k$, and wherein the observation $z_k$ comprises (i) the position of at least one of the M features in the image, and (ii) the distance data indicative of distance; and g) using (7) (i) the state estimate, (ii) the observation model, and (iii) the observation $z_k$, to determine the state $x_k$ (8) of the camera at the time $t_k$. The invention also relates to a computer program product and to an assembly.

17 Claims, 2 Drawing Sheets

(52) U.S. Cl.
CPC ............... *G06T 2207/10028* (2013.01); *G06T 2207/30204* (2013.01); *G06T 2207/30252* (2013.01)

(58) Field of Classification Search
USPC ........................................................ 382/103
See application file for complete search history.

(56) References Cited

FOREIGN PATENT DOCUMENTS

| | | |
|---|---|---|
| JP | 2004110802 A | 8/2004 |
| JP | 2011043419 A | 3/2011 |

OTHER PUBLICATIONS

Akio Kosaka et al., "Vision-Based Motion Tracking of Rigid Objects Using Prediction of Uncertainties," Proceedings of 1995 IEEE International Conference on Robotics and Automation, Nagoya, Japan, Jan. 1, 1995, pp. 2637-2644 vol. 3, 8 pages.
International Search Report and Written Opinion for PCT/IB2021/061637, dated Mar. 3, 2022, 12 pages.
A. Kosaka, et al., "Augmented Reality System for Surgical Navigation Using Robust Target Vision", IEEE, 2000, pp. 187-194.
H. Plank, et al., "High-Performance Indoor Positioning and Pose Estimation with Time-of-Flight 3D Imaging", European Union, 2017, 8 pgs.
Alvarado Vasquez, et al., "Sensor Fusion for Tour-Guide Robot Localization", IEEE Access, 2018, 18 pgs.
Chinese Office Action issued in Chinese Patent Application No. 202180088100.2, mailed May 9, 2025, 18 pages.
English Translation of Japanese Office Action issued in Japanese Patent Application No. 2023-535396, mailed Dec. 10, 2024, 5 pages.
Ehab I. Al Khatib et al., Low-Cost Reduced Navigation System for Mobile Robot in Indoor/Outdoor Environments, IEEE Access, IEEE, Feb. 3, 2020, vol. 8, pp. 25014-25026, https://ieeexplore.ieee.org/document/8978784, 13 pages.

\* cited by examiner

METHOD AND SYSTEM FOR DETERMINING A STATE OF A CAMERA

RELATED APPLICATIONS

This application is a national phase of PCT/IB2021/061637, filed on Dec. 13, 2021, which claims priority to U.S. Provisional Application No. 63/132,142, filed on Dec. 30, 2020, and U.S. Provisional Application No. 63/132,176, filed on Dec. 30, 2020. The contents of these applications are hereby incorporated by reference in their entirety.

FIELD OF THE INVENTION

The present invention relates to a method for determining a state $x_k$ of a camera at a time $t_k$, and to a computer program product and assembly.

BACKGROUND TO THE INVENTION

Indoor navigation of robots, for example drones, is an important problem, e.g., in the field of automatic warehousing. To facilitate indoor navigation, the robot, e.g., the drone, needs to know its current position with respect to its environment. Contrary to outdoor environments in which GNSS (Global Navigation Satellite Systems) can be employed, providing a high localization accuracy, GNSS in indoor environments is often not reliable due to signal attenuation and multi-path effects. Existing RF localization technologies for indoor and outdoor spaces also struggle with signal attenuation and multi-path effects limiting the usability in complex environments, for instance, in the presence of a significant amount of metal.

In the prior art, optical localization systems for indoor localization are known. Such optical localization systems extract information from images captured by a camera. The location of an object of which the pose is to be determined can then be computed using triangulation techniques after relating the coordinates of features in the two-dimensional camera image to three-dimensional rays corresponding to said features. The relation between image coordinates and three-dimensional rays is typically captured in a combination of first-principle camera models (such as pinhole or fisheye camera models) and calibrated distortion models (typically capturing lens characteristics, mounting tolerances, and other deviations from a first-principle model).

In optical localization systems for determining the location of an object known in the prior art, the camera can be rigidly mounted outside the object, observing the motion of the object ("outside-in tracking"), or the camera can be mounted on the object itself observing the apparent motion of the environment ("inside-out tracking"). While outside-in tracking localization systems typically determine the location of the object relative to the known locations of the camera(s), inside-out tracking systems like SLAM (Simultaneous Localization and Mapping) typically generate a map of the environment in which the object moves. The map is expressed in an unknown coordinate system but can be related to a known coordinate system in case the locations of at least parts of the environment are already known or if the initial pose of the camera is known. In both cases, some error will accumulate as the map is expanded away from the initial field of view of the camera or from the parts of the environment with known location. The potential for propagating errors is a problem for applications where the location information must be referred to external information, for example to display the location of the object in a predefined map, to relate it to the location of another such object, or when the location is used to guide the object to a location known in an external coordinate system.

Outside-in optical localization systems typically scale very poorly to larger localization systems because at every point, the object must be seen by several cameras in order to triangulate the 3D position of the object. Especially for large spaces where only few objects are tracked this is economically not viable.

The position and orientation of a camera, e.g., mounted on a drone, may be summarized in a state, and the state may be tracked over time. Existing methods for determining the state of a camera do not provide an adequate level of accuracy, however, thus making them insufficient for use in many applications.

It is an object of the present invention to mitigate at least some of the disadvantages associated with the methods for determining a state $x_k$ of a camera known from the state of the art.

SUMMARY OF THE INVENTION

According to a first aspect of the present invention there is provided a method for determining a state $x_k$ of a camera, involving the steps recited in claim 1. Further optional features and embodiments of the method of the present invention are described in the dependent patent claims.

The invention relates to a method for determining a state $x_k$ of a camera at a time $t_k$, the state $x_k$ being a realization of a state random variable $X_k$, wherein the state is related to a state-space model of a movement of the camera. The method comprises the following steps: a) receiving an image of a scene of interest in an indoor environment captured by the camera at the time $t_k$, wherein the indoor environment comprises N landmarks having known positions in a world coordinate system, N being a natural number; b) receiving a state estimate $\widehat{x_k}$ of the camera at the time $t_k$; c) determining positions of M features in the image, M being a natural number smaller than or equal to N, wherein an injective mapping between the M features and the N landmarks exists; d) receiving distance data indicative of distance between the M features and the corresponding M landmarks, respectively; e) determining an injective mapping estimate from the M features into the set of the N landmarks using at least (i) the positions of the M features in the image and (ii) the state estimate; f) using the determined injective mapping estimate to set up an observation model in the state-space model, wherein the observation model is configured for mapping the state random variable $X_k$ of the camera onto a joint observation random variable $Z_k$, wherein at the time $t_k$, an observation $z_k$ is a realization of the joint observation random variable $Z_k$, and wherein the observation $z_k$ comprises (i) the position of at least one of the M features in the image, and (ii) the distance data indicative of distance; and g) using (i) the state estimate, (ii) the observation model, and (iii) the observation $z_k$, to determine the state $x_k$ of the camera at the time $t_k$.

The orientations of the N landmarks in the world coordinate system may also be known. Alternatively, the distance data indicative of distance may also relate to distances between a camera center of the camera and the M landmarks corresponding to the M features.

In principle, the number of features may also be larger than N in case outliers are detected as features. In this case, M would be larger than N. Such outliers may be removed during different processing steps: they could be removed during the determining of the injective mapping estimate, for example; outliers could also be removed before the determining of the injective mapping estimate based on (i) the received distance data indicative of distance, (ii) the state estimate, and (iii) the known positions of the N landmarks in the world coordinate system, e.g., by excluding features for which no plausible landmark may be identified with respect to the respective distance data indicative of distance. It may hence be assumed that—in case outliers are present—such outliers are removed: the M features are features which correspond to actual landmarks.

In an embodiment of the method according to the invention, the joint observation random variable $Z_k$ comprises M observation random variables $Z_{k,i}$, i=1, . . . , M, wherein each of the M observation random variables $Z_{k,i}$ comprises a distance data random variable $D_{k,i}$, and wherein the observation $z_k$ comprises observations $z_{k,i}$, i=1, . . . , M.

In a further embodiment of the method according to the invention, the observation model is configured to model a 3D-to-2D projection of each of the M landmarks corresponding to the M features to the corresponding feature, respectively. The injective mapping estimate, subsequently termed IME, links the M features with the M landmarks, wherein, for a feature i of the M features, the corresponding landmark is landmark IME(i), and wherein, for a feature-landmark pair (i,IME(i)), the observation model links the observation random variable $Z_{k,i}$ to the state random variable $X_k$: $Z_{k,i}=h_{IME(i)}(X_k)$, wherein observation model function $h_{IME(i)}(\bullet)$ is dependent on landmark IME(i), and wherein the observation model comprises the observation model functions $h_{IME(i)}(\bullet)$, i=1, . . . , M.

In a further embodiment of the method according to the invention, the observation model function $h_{IME(i)}(\bullet)$ is configured to map the state random variable $X_k$ onto the distance data random variable $D_{k,i}$, wherein the distance data indicative of distance $d_{k,i}$, $d_{k,i}$ being a realization of the distance data random variable $D_{k,i}$, relates to the distance between feature i and landmark IME(i).

Alternatively, the distance data indicative of distance $d_{k,i}$ as well as the distance data random variable $D_{k,i}$ may relate to the distance between the camera center of the camera and landmark IME(i).

In a further embodiment of the method according to the invention, the determining of the state $x_k$ using (i) the state estimate $\widehat{x_k}$, (ii) the observation model, and (iii) the observation $z_k$ is done by using update equations provided by applying an extended Kalman filter to the state-space model, wherein the update equations comprise the Jacobian matrix of the observation model, wherein the Jacobian matrix is evaluated at the state estimate $\widehat{x_k}$.

In a further embodiment of the method according to the invention, a separate Jacobian matrix is used for each observation model function $h_{IME(i)}(\bullet)$, i=1, . . . , M, and wherein the update equations, using the respective separate Jacobian matrix, are consecutively and independently invoked for all M features.

In a further embodiment of the method according to the invention, the distance data indicative of distance are embodied as distances, which distances are provided by a time-of-flight (TOF) camera as distances between the TOF camera and the M landmarks corresponding to the M features, respectively.

The TOF camera may have a camera center and determine distances between its camera center and the M landmarks corresponding to the M features.

TOF camera functionality may be provided as part of the camera. Alternatively, the TOF camera may be a separate device. In case the TOF camera is a separate device, a coordinate transformation between the TOF camera and the camera may be assumed to be known. Measurements carried out by the TOF camera may then be transferred into a local coordinate system of the camera, and thereby compared to the image captured by the camera.

In a further embodiment of the method according to the invention, the image is captured by the camera as a light source is operated to emit light which illuminates the scene of interest.

In a further embodiment of the method according to the invention, the distance data indicative of distance are embodied as intensity information for each of the M features.

The term intensity information may, e.g., refer to an average intensity of a feature, or to a maximum intensity of a feature. Average intensity and maximum intensity of a feature may be determined from pixels, wherein said pixels capture the feature, which are part of the image sensor capturing the image.

In a further embodiment of the method according to the invention, each of the M observation model functions $h_{IME(i)}(\bullet)$, i=1, . . . , M, comprises a respective illumination model which is configured to map the state random variable $X_k$ onto the respective distance data random variable $D_{k,i}$, i=1, . . . , M, the distance data random variables statistically modelling intensity information, wherein the illumination model i, i=1, . . . , M, uses at least (i) a power of light emitted by the light source and an estimated light source position, (ii) a directivity of light emission by the light source, (iii) a reflectivity of landmark IME(i), and (iv) the known position of landmark IME(i) in the world coordinate system, for mapping the state random variable $X_k$ onto the distance data random variables $D_{k,i}$, i=1, . . . , M.

The estimated light source position may be estimated from the state estimate $\widehat{x_k}$ in case a geometrical relationship of the light source to the camera is known.

In a further embodiment of the method according to the invention, the M observation model functions each comprise a camera model of the camera.

In a further embodiment of the method according to the invention, the camera model is embodied as a pinhole camera model.

According to a further aspect of the present invention there is provided a computer program product comprising instructions which when executed by a computer, cause the computer to carry out a method according to the invention.

According to a further aspect of the present invention there is provided an assembly, comprising (a) a camera, (b) a plurality of landmarks, and (c) a controller, wherein the controller is configured to carry out a method according to the invention.

In an embodiment of the assembly according to the invention, the assembly further comprises a time-of-flight (TOF) camera and/or a light source.

The assembly may comprise a camera and a separate TOF camera. A known coordinate transformation between the camera and the separate TOF camera may be assumed to be known, implying that measuring results obtained by either camera may be translated between the respective local coordinate system of the two cameras.

BRIEF DESCRIPTION OF DRAWINGS

Exemplar embodiments of the invention are disclosed in the description and illustrated by the drawings in which.

DETAILED DESCRIPTION OF DRAWINGS

Figure 1:
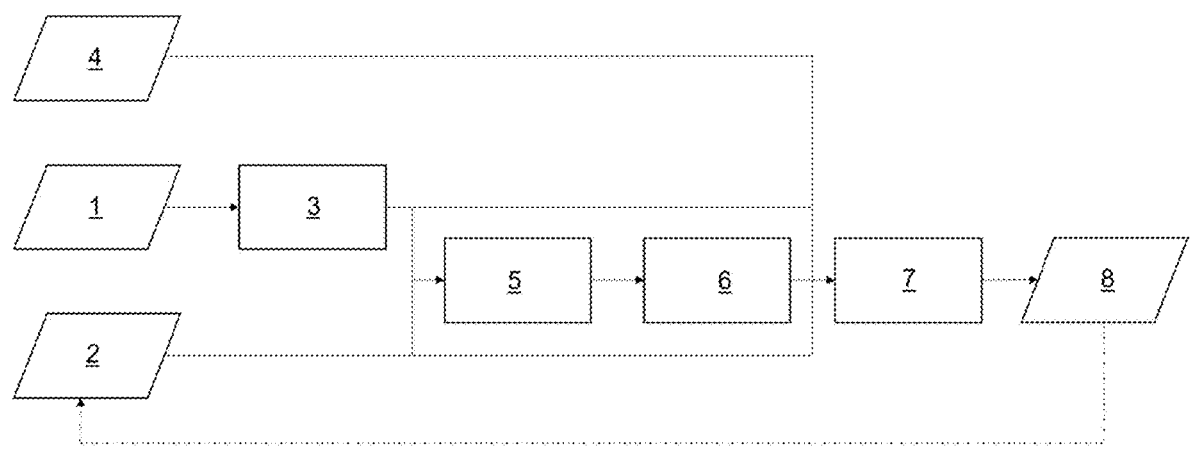
FIG. 1 shows a schematic depiction of the method according to the invention for determining a state $x_k$ of a camera at a time $t_k$.

FIG. 1 shows a schematic depiction of the method according to the invention for determining a state $x_k$ of a camera at a time $t_k$. The state $x_k$ may comprise a 3D position and a 3D orientation of the camera at the time $t_k$. The 3D position and the 3D orientation may be expressed with respect to a world coordinate system which is a predefined reference frame. The state $x_k$ may additionally comprise 3D velocity information of the camera at the time $t_k$, wherein said 3D velocity information may, for example, also be expressed with respect to the world coordinate system. As the camera may move through an indoor environment over time, its state may need to be tracked to determine current positions and orientations of the camera.

At the time $t_k$, the camera may capture an image 1 of a scene of interest in the indoor environment comprising N landmarks. The positions (and possibly orientations) of the N landmarks in the indoor environment are known in the world coordinate system. Since, at the time $t_k$, the camera has a specific position and orientation, not all the N landmarks may be visible to the camera. For example, J≤N landmarks may be visible to the camera at the time $t_k$, which J landmarks are projected by the camera onto the image 1 of the scene of interest. The projection of a landmark into an image is termed a 'feature'. From the J landmarks projected onto the image 1, M≤J features may be identified, and their 2D positions in the image determined 3. The 2D position of a feature may relate to the 2D position of, e.g., a centroid of said feature. Some of the J landmarks may be positioned and oriented to the camera at the time $t_k$ in such a way that their projections onto the image are too small/dim/badly detectable. In this case, M may be strictly smaller than J, i.e., M<J, and the remaining J−M landmarks which are projected by the camera onto the image 1 may be disregarded/not detected. Features may be determined using a scale-invariant feature transform, for example, or using a speeded up robust feature detector, or using a gradient location and orientation histogram detector, or using any other feature detector known from the prior art, or using a custom feature detector tailored to possible shapes of the landmarks in the indoor environment. It is also assumed that the M features are features which correspond to projections of landmarks onto the image, i.e., that outliers, which are projections of other objects which are not landmarks on to the image, are removed from the image.

The image 1 is captured by an image sensor of the camera. The image sensor has a position and orientation in the world coordinate system, wherein said position and orientation of the image sensor at the time $t_k$ may be implicitly encoded in the state $x_k$ of the camera. A feature with a specific 2D position in the image thereby also has a 3D position in space, wherein the 3D position corresponds to the 3D position of the point on the image sensor corresponding to the specific 2D position of the feature.

In a next step, an injective mapping estimate from the M features to the N landmarks is determined 5. Since typically it holds that M<N, the injective mapping estimate is typically only injective and not surjective as well. The injective mapping estimate describes which landmark of the N landmarks induced which feature of the M features in the image. To determine 5 such an injective mapping estimate, a position/orientation of the camera at the time $t_k$ may need to be known. Instead of the current state $x_k$, however, only a state estimate $\widehat{x_k}$ 2 is available. Starting with the state estimate $\widehat{x_k}$ 2, the injective mapping estimate may be determined, wherein during the injective mapping estimate, approximations to the state $x_k$ may be constructed. Since the injective mapping estimate is an injective function from one set to another, it may be represented in functional notation as IME(•), wherein the domain on which the injective mapping estimate is configured to operate is the set of M features, and the range is the set of N landmarks: a feature i is linked to landmark IME(i) through the injective mapping estimate.

Using the determined feature-to-landmark assignment IME(•), in a next step an observation model is set up 6. The observation model is configured to map a state random variable $X_k$, wherein the state $x_k$ is a realization of the state random variable, onto a joint observation random variable $Z_k$, the joint observation random variable termed joint since it probabilistically describes observations related to the M features. Observation $z_k$ is a realization of the joint observation random variable $Z_k$, wherein said observation is obtained through an actual measurement process, or through a computation carried out on data provided by an actual measurement process. The joint observation random variable $Z_k$ may comprise M observation random variables $Z_{k,i}$, i=1, . . . , M, wherein each of the M observation random variables may statistically describe observations related to the respective feature. The M observation random variables may be statistically independent from one another, or the joint observation random variable may comprise a probability distribution which does not factor into a product of probability distributions of the M observation random variables.

The observation model may comprise M observation model functions $h_{IME(i)}(•)$, i=1, . . . , M, wherein each of the M observation model functions may be configured to map the state random variable $X_k$ onto the respective observation random variable $Z_{k,i}$, i=1, . . . , M. Each observation random variable $Z_{k,i}$, i=1, . . . , M, may comprise a distance data random variable $D_{k,i}$, i=1, . . . , M, and a random variable related to the 2D position of feature i, i=1, . . . , M, respectively. Distance data indicative of distance $d_{k,i}$, i=1, . . . , M, may be realizations of the distance data random variables. The presence of a distance data random variable in an observation random variable implies that a quantity related to a distance between a feature i and its corresponding landmark is measured. The corresponding landmark may be the landmark which actually caused feature i (through projection by the camera) as well as observations associated to feature i. The corresponding landmark may be equal to landmark IME(i) in case the determined 5 injective mapping estimate assigns features to landmarks in a correct way. The term distance between a feature i and its corresponding landmark may relate to a distance between the 3D position of said feature i and a known 3D position of said corresponding landmark in the world coordinate system. Instead of a distance between the 3D position of a feature and its corresponding landmark, a distance between a camera center of the camera and the corresponding landmark may be used.

The distance data random variables $D_{k,i}$, i=1, . . . , M, may statistically model intensities of features, and/or actual distances between a feature and its corresponding landmark.

The intensity of a feature comprises, e.g., information on the distance between the feature and its corresponding landmarks, because intensity of a feature typically decreases with increasing distance between the feature and its corresponding landmark. Distance data indicative of distance are received 4 by the method according to the invention as part of the observation $z_k$.

The observation model therefore models the mapping of the M landmarks—which M landmarks correspond to the M features by way of the determined injective mapping estimate—onto an image plane on which the image sensor is located according to the state random variable $X_k$. The observation model may also comprise processing steps, e.g., for extracting a 2D position of a projected landmark, i.e., a feature, the 2D position, e.g., being a centroid of the feature in the image. The observation model may comprise a mathematical camera model, e.g., embodied as pinhole camera model, which mathematically describes the projection of a point in three-dimensional space onto the image plane on which the image sensor of the camera lies. To map the state random variable $X_k$ onto a distance random variable $D_{k,i}$, i=1, . . . , M, the observation model may comprise an illumination model in case a distance random variable relates to an intensity of a feature, or it may comprise a distance estimation model for determining a distance between a feature i and landmark IME(i).

An illumination model may model power losses of light emitted by a light source between emission by a light source and reception by the camera. The landmarks may be embodied as retroreflectors having a retroreflector-specific reflectivity, and the light source may be used for illuminating the retroreflectors. Light reflected by the retroreflectors may then appear brightly in the image 1 captured by the camera. The illumination model may comprise the reflectivity of a landmark IME(i) at which the emitted light is reflected. The illumination model may also comprise a distance (potentially with statistical uncertainty) between a feature i and its landmark IME(i), wherein the distance may be obtained based on the state estimate $\widehat{x_k}$ and a known position of the landmark IME(i) in the world coordinate system. The illumination model may further comprise a power of light emitted by the light source, a directivity of the light source, and an estimated light source position. In case the relative position and orientation of the camera to the light source is known, the estimated light source position may be determined using the state estimate $\widehat{x_k}$. The illumination model may be a part of the observation model.

In case the distance random variables $D_{k,i}$, i=1, . . . , M, statistically model actual distances between features i, i=1, . . . , M, and landmarks IME(i), i=1, . . . , M, respectively, distances may be measured using a time-of-flight (TOF) camera. The TOF camera can be a phase-based TOF camera, or a pulse-based TOF camera. The TOF camera may provide a distance between a feature and its corresponding landmark. TOF camera functionality may be a part of the camera, or the TOF camera may be a separate device. In case the TOF camera and the camera are separate devices, geometrical transformations between the TOF camera and the camera may be known, implying that measurements carried out using the TOF camera can be related to measurements carried out by the camera.

The observation model is part of a state-space model used for tracking a movement of the camera through space. Besides the observation model, the state-space model may typically comprise a state-transition model. The state-transition model describes how the state itself evolves over time. In case the camera is mounted on a drone, for example, the state-transition model may comprise equations modelling drone flight, the equations potentially comprising control input used for controlling the drone flight. The state-transition model typically also comprises a further term modelling statistical uncertainty in state propagation. The observation model and/or the state-transition model may be linear or nonlinear in their input, which input is the state of the camera. The state-transition model may also have the control input as input.

In case the observation model and the state-transition model are both linear, a Kalman filter may be used for determining 7 the state $x_k$ 8 at the time $t_k$, using at least the state estimate $\widehat{x_k}$, the observation model and the observation $z_k$, which observation is a realization of the joint observation random variable $Z_k$. The observation comprises (i) the 2D positions of the M features in the image, and (ii) the distance data indicative of distance, e.g., embodied as intensities of features or as measured distances between features and their respective corresponding landmarks. During the determining 7 of the state $x_k$, the state estimate $\widehat{x_k}$ is used as input to the observation model (alternatively, an approximation to the state determined during the determining of the injective mapping estimate may be used as input to the observation model). In case the observation model and/or the state-transition model are nonlinear, an extended Kalman filter may be used, wherein the extended Kalman filter linearizes the nonlinear equations. Both Kalman filter and extended Kalman filter provide update equations for updating the state estimate $\widehat{x_k}$ using the observation model and the measured observation. Once the state $x_k$ 8 has been determined 7, it may be propagated in time, e.g., from time $t_k$ to time $t_{k+1}$, using the state-transition model, the propagation in time providing a state estimate $\widehat{x_{k+1}}$ for the state of the camera at the time $t_{k+1}$. Instead of Kalman filters, particle filters may be used, or state observers such as Luenberger observers may be used, or any other known filtering technique known from the state of the art. The state estimate $\widehat{x_{k+1}}$ may be taken as a new state estimate for determining the state $x_{k+1}$ at the time $t_{k+1}$.

The update equations of the Kalman filter or of the extended Kalman filter may be invoked at once for all M features, or separately for each feature of the M features. In case an extended Kalman filter is used, a Jacobian of the observation model needs to be computed with respect to the state, and the Jacobian is evaluated at the state estimate $\widehat{x_k}$ (or alternatively at an approximation to the state determined during the determining of the injective mapping estimate). In case the extended Kalman filter is separately invoked for each of the M features, a separate Jacobian may be determined for each of the M observation model functions $h_{IME(i)}(\bullet)$, i=1, . . . , M. In case the time $t_{k+1}$-$t_k$ between the capture of consecutive images by the camera is not long enough to process all M features, not all the M features may be considered during the updating of the state.

Figure 2:
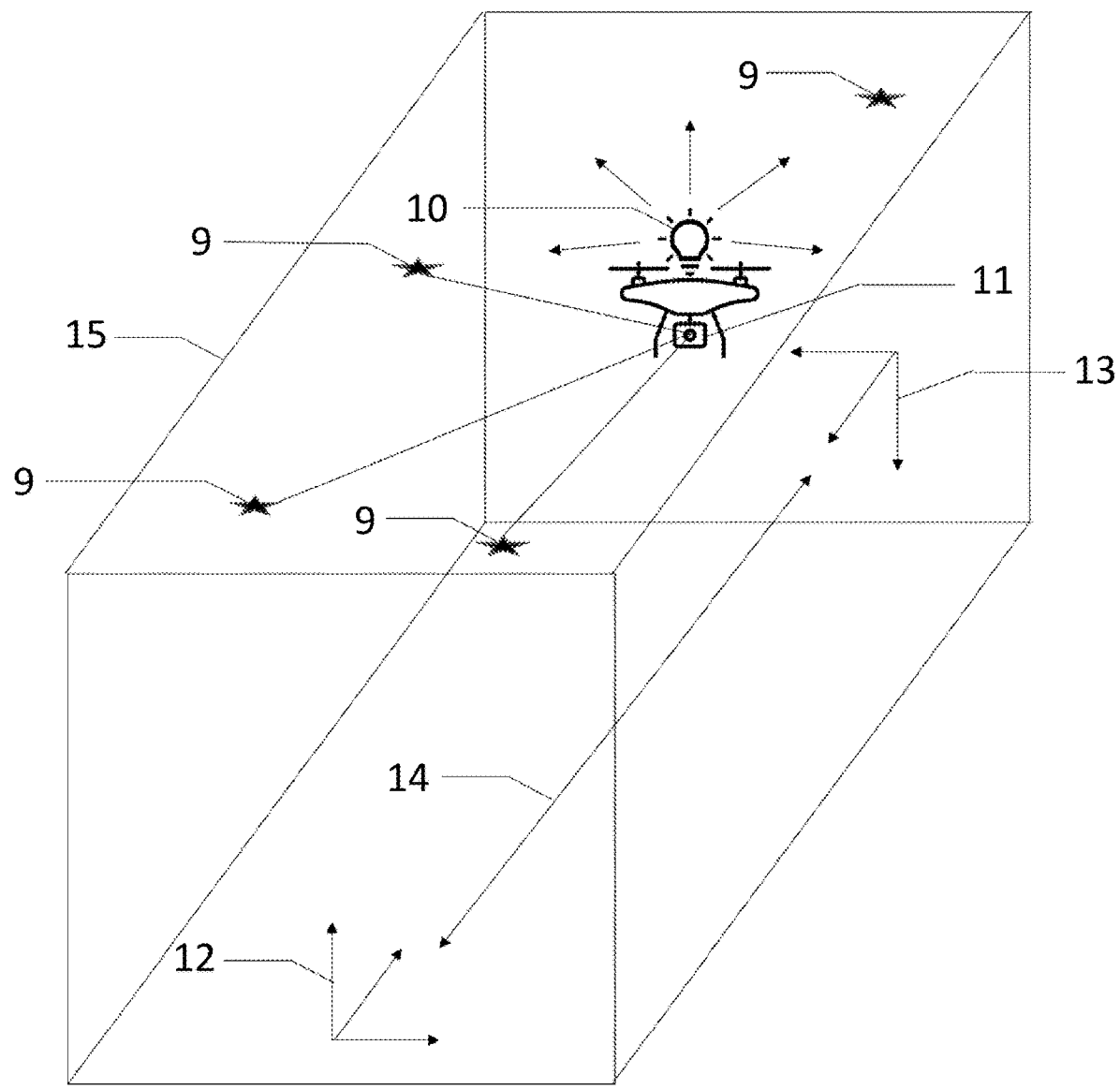
FIG. 2 shows a schematic depiction of a drone comprising a light source and a camera, wherein the drone is configured to fly in an indoor environment, wherein landmarks are arranged at a plurality of positions in said indoor environment.

FIG. 2 shows a schematic depiction of a drone comprising a light source 10 and a camera 11, wherein the drone is flying in an indoor environment 15. Landmarks 9, which in this particular example are embodied as retroreflectors, are arranged at a plurality of positions in the indoor environment 15. The landmarks 9 may be mounted on a ceiling of the indoor environment 15. At any given pose (comprising position and orientation) of the drone, some landmarks 9 may be visible to the camera 11—in FIG. 2 indicated by lines between the landmarks 9 and the camera 11—while other landmarks 9 may not be visible to the camera 11. The positions of the landmarks 9 may be known in a world coordinate system 12 which is a predefined reference frame 12, and the current location of the drone may be expressed as a drone coordinate system 13 which is a second reference frame 13, wherein a coordinate transformation 14 may be known between the world coordinate system 12 and the drone coordinate system 13. In case the camera 11 and the light source 10 are mounted rigidly to the drone and their pose relative to the drone is known, the pose of the camera 11 and of the light source 10 can be related to the world coordinate system 12 using the drone coordinate system 13. The current position of the drone can be determined using image(s) of scene(s) of interest 15 in the indoor environment 15, specifically of the landmarks 9 having known positions. Alternatively, or in addition, the drone may be equipped with an inertial measurement unit, which inertial measurement unit may be also used for pose determination. The light source 10 may be an isotropically emitting light source, or it may be a directional light source emitting in a non-isotropic manner. Light source 10 and camera 11 are ideally close to each other, specifically in case the landmarks 9 are embodied as retroreflectors. The camera 11 may also be mounted on top of the drone during a normal movement condition of the drone, i.e., next to the light source 10. The term normal movement condition may refer to a usual movement of the drone with respect to a ground of the scene of interest. The drone may additionally comprise a time-of-flight (TOF) camera for directly measuring distances to the landmarks 9. TOF camera functionality may be provided by a separate TOF camera, or TOF camera functionality may be included in the camera 11.

The invention claimed is:

1. Method for determining a state xk of a camera at a time tk, the state xk being a realization of a state random variable Xk, wherein the state is related to a state-space model of a movement of the camera, the method comprising:
    a) receiving an image of a scene of interest in an indoor environment captured by the camera at the time tk, wherein the indoor environment comprises N landmarks having known positions in a world coordinate system, N being a natural number;
    b) receiving a state estimate $\hat{x}_k$ of the camera at the time tk;
    c) determining positions of M features in the image, M being a natural number smaller than or equal to N, wherein an injective mapping between the M features and the N landmarks exists;
    d) receiving distance data indicative of distance between the M features and the corresponding M landmarks, respectively;
    e) determining an injective mapping estimate from the M features into the set of the N landmarks using at least (i) the positions of the M features in the image and (ii) the state estimate;
    f) using the determined injective mapping estimate to set up an observation model in the state-space model, wherein the observation model is configured for mapping the state random variable Xk of the camera onto a joint observation random variable Zk, wherein at the time tk, an observation zk is a realization of the joint observation random variable Zk, and wherein the observation zk comprises (i) the position of at least one of the M features in the image, and (ii) the distance data indicative of distance; and
    g) using (i) the state estimate, (ii) the observation model, and (iii) the observation zk, to determine the state xk of the camera at the time tk.

2. Method according to claim 1, wherein the joint observation random variable $Z_k$ comprises M observation random variables $Z_{k,i}$, i=1, . . . , M, wherein each of the M observation random variables $Z_{k,i}$ comprises a distance data random variable $D_{k,i}$, and wherein the observation $z_k$ comprises observations $z_{k,i}$, i=1, . . . , M.

3. Method according to claim 2, wherein the observation model is configured to model a 3D-to-2D projection of each of the M landmarks corresponding to the M features to the corresponding feature, respectively, and wherein the injective mapping estimate, subsequently termed IME, links the M features with the M landmarks, wherein, for a feature i of the M features, the corresponding landmark is landmark IME (i), and wherein, for a feature-landmark pair (i,IME(i)), the observation model links the observation random variable $Z_{k,i}$ to the state random variable $X_k$: $Z_{k,i}=h_{IME(i)}(X_k)$, wherein observation model function $h_{IME(i)}(\bullet)$ is dependent on landmark IME(i), and wherein the observation model comprises the observation model functions $h_{IME(i)}(\bullet)$, i=1 . . . , M.

4. Method according to claim 3, wherein the observation model function $h_{IME(i)}(\bullet)$ is configured to map the state random variable $X_k$ onto the distance data random variable $D_{k,i}$, wherein the distance data indicative of distance $d_{k,i}$, $d_{k,i}$ being a realization of the distance data random variable $D_{k,i}$, relates to the distance between feature i and landmark IME(i).

5. Method according to claim 1, wherein the determining of the state $x_k$ using (i) the state estimate $\hat{x}_k$, (ii) the observation model, and (iii) the observation $z_k$, is done by using update equations provided by applying an extended Kalman filter to the state-space model, wherein the update equations comprise the Jacobian matrix of the observation model, wherein the Jacobian matrix is evaluated at the state estimate $\hat{x}_k$.

6. Method according to claim 5, wherein a separate Jacobian matrix is used for each observation model function $h_{IME(i)}(\bullet)$, i=1, . . . , M, and wherein the update equations, using the respective separate Jacobian matrix, are consecutively and independently invoked for all M features.

7. Method according to claim 1, wherein the distance data indicative of distance are embodied as distances, which distances are provided by a time-of-flight (TOF) camera as distances between the TOF camera and the M landmarks corresponding to the M features, respectively.

8. Method according to claim 1, wherein the image is captured by the camera as a light source is operated to emit light which illuminates the scene of interest.

9. Method according to claim 8, wherein the distance data indicative of distance are embodied as intensity information for each of the M features.

10. Method according to claim 9, wherein each of the M observation model functions $h_{IME(i)}(\bullet)$, i=1 . . . , M, comprises a respective illumination model which is configured to map the state random variable $X_k$ onto the respective distance data random variable $D_{k,i}$, i=1, . . . , M, the distance data random variables statistically modelling intensity information, wherein the illumination model i, i=1, . . . , M, uses at least (i) a power of light emitted by the light source and an estimated light source position, (ii) a directivity of light emission by the light source, (iii) a reflectivity of landmark IME(i), and (iv) the known position of landmark IME(i) in the world coordinate system, for mapping the state random variable $X_k$ onto the distance data random variables $D_{k,i}$, i=1, . . . , M.

11. Method according to claim 1, wherein the M observation model functions each comprise a camera model of the camera.

12. Method according to claim 11, wherein the camera model is embodied as a pinhole camera model.

13. Method according to claim 7 wherein said distances provided by the time-of-flight (TOF) camera, are the physical distances from the TOF camera to the M landmarks corresponding to the M features.

14. Method according to claim 9 wherein the intensity of a feature in the image decreases with increasing physical distance between the camera and the landmark corresponding to said feature.

15. A non-transitory computer-readable medium having stored thereon instructions which when executed by a processor, cause the processor to carry out a method according to claim 1.

16. Assembly, comprising (a) a camera, (b) a plurality of landmarks, and (c) a controller, wherein the controller is configured to carry out a method according to claim 1.

17. Assembly according to claim 16, further comprising a time-of-flight (TOF) camera and/or a light source.

* * * * *